United States Patent
Hayano et al.

(10) Patent No.: US 7,098,909 B2
(45) Date of Patent: Aug. 29, 2006

(54) AUTOMATIC GENERATING DEVICE FOR 3-D STRUCTURE SHAPE, AUTOMATIC GENERATING METHOD, PROGRAM THEREFOR, AND RECORDING MEDIUM RECORDING THE PROGRAM

(75) Inventors: Tomoaki Hayano, incapacitated, Tokyo (JP); Naomi Hayano, legal representative, Machida (JP); Atsushi Sone, Tokyo (JP); Bujin Goh, Tokyo (JP)

(73) Assignee: Cad Center Corporation, Tokyo (JP)

( * ) Notice: Subject to any disclaimer, the term of this patent is extended or adjusted under 35 U.S.C. 154(b) by 305 days.

(21) Appl. No.: 10/433,315

(22) PCT Filed: Sep. 28, 2002

(86) PCT No.: PCT/JP02/06613

§ 371 (c)(1),
(2), (4) Date: Jun. 2, 2003

(87) PCT Pub. No.: WO03/012740

PCT Pub. Date: Feb. 13, 2003

(65) Prior Publication Data

US 2004/0041805 A1  Mar. 4, 2004

(30) Foreign Application Priority Data

Jul. 31, 2001  (JP) ............................ 2001-232080

(51) Int. Cl.
   *G06T 17/00* (2006.01)
(52) U.S. Cl. ................. 345/420; 345/419; 345/421; 345/441; 345/619

(58) Field of Classification Search ................. 345/419, 345/420, 619; 701/211
See application file for complete search history.

(56) References Cited

U.S. PATENT DOCUMENTS 5,303,337 A * 4/1994 Ishida ..................... 345/419
5,988,862 A * 11/1999 Kacyra et al. ............... 703/6
6,619,406 B1 * 9/2003 Kacyra et al. ............ 172/4.5

FOREIGN PATENT DOCUMENTS

| JP | 7-93540 | 4/1995 |
| JP | 8-304042 | 11/1996 |
| JP | 10-283461 | 10/1998 |
| JP | 2001-143057 | 5/2001 |

* cited by examiner

*Primary Examiner*—Ulka J. Chauhan
*Assistant Examiner*—Said Broome
(74) *Attorney, Agent, or Firm*—Ladas & Parry LLP

(57) ABSTRACT

An automatic three-dimensional structure shape generation apparatus for automatically generating the shape of a three-dimensional structure from a plurality of points having three-dimensional coordinates containing height information includes means for constituting a point group by collecting points such that three-dimensional distances between the points are within a predetermined threshold or two-dimensional distances and height differences between the points are within predetermined thresholds, means for detecting a polygon that includes the points of the point group at a minimum area from at least one of a plurality of predetermined polygons, and means for generating an outer shape or a rooftop shape of the three-dimensional structure from the polygon having the minimum area.

19 Claims, 10 Drawing Sheets

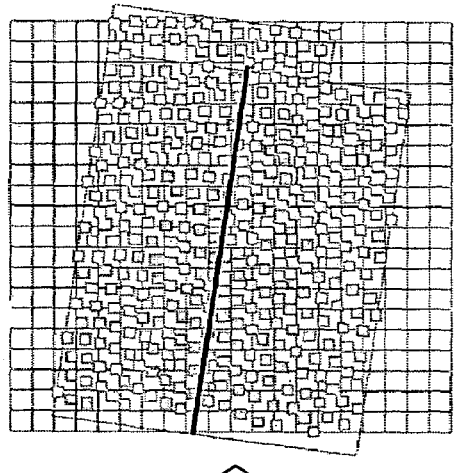
FIG.7A — POINTS OF POINT GROUP
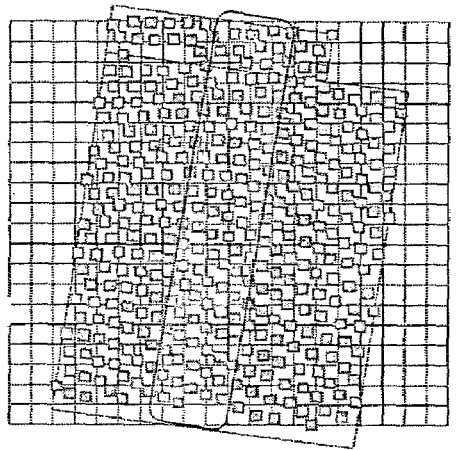
FIG.7B — EXTRACTED POINTS LOCATED AT HIGHER POSITIONS
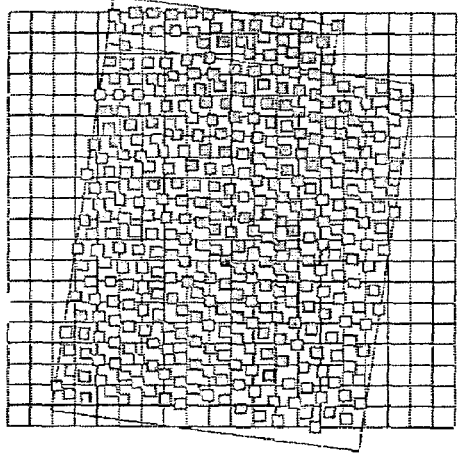
FIG.7C — ROOF EDGE

AUTOMATIC GENERATING DEVICE FOR 3-D STRUCTURE SHAPE, AUTOMATIC GENERATING METHOD, PROGRAM THEREFOR, AND RECORDING MEDIUM RECORDING THE PROGRAM

TECHNICAL FIELD

The present invention relates to an automatic three-dimensional structure shape generation apparatus and an automatic three-dimensional structure shape generation method for automatically generating shapes of three-dimensional structures such as land features and buildings, which are components of a three-dimensional map, by using information regarding a cloud of points in a three-dimensional coordinate system, which is obtained through an apparatus (a laser profiler) or LIDAR (LIght Detection And Ranging) data for detecting height data of the land features, the buildings and other objects by irradiating lasers toward the ground from an airplane in the sky, a program thereof and a recording medium for recording the program.

BACKGROUND ART

In recent times, the marked development of information technologies (IT) has promoted transition from conventional paper-based two-dimensional maps to two-dimensional electronic maps, and further three-dimensional electronic maps are being constructed to target a wide area such as car navigation systems and GISs (Geographic Information Systems) using computers.

In order to construct a three-dimensional electronic map, it is necessary to obtain height information regarding land features, buildings and other objects, which are components of the three-dimensional electronic map. A laser profiler or LIDAR data have been developed and used as means for easily acquiring such height information. The laser profiler irradiates lasers toward the ground from an airplane and obtains height information based on time differences between the lasers reflected from the ground.

The laser profiler obtains point cloud data constituted of a large number of three-dimensional point data including the height information. In order to construct a three-dimensional electronic map based on the point cloud data, it is necessary to detect land features and three-dimensional shapes of three-dimensional structures such as outer shapes, rooftop shapes, and further roof shapes thereof.

In order to detect the land features and the three-dimensional structure shapes based on the point cloud data, a variety of methods have been conventionally used. In one method, land features and three-dimensional structure shapes such as building shapes are detected and determined through visual observation on a computer display from the height information of the point cloud data. In another method, the land features and the three-dimensional structure shapes are detected and determined by using a satellite image (satellite imagery data) of the ground taken from a satellite together with the height information of the point cloud data, and the satellite image is compared with the height information through visual observation thereof on a computer display. Then, a drawing is made by using a computer to reshape and edit the shapes of three-dimensional structures detected in accordance with the above-mentioned methods.

The conventional methods, however, need a considerable amount of human labor, and the three-dimensional structure shapes are detected and determined depending on skills and experiences of staff members. As a result, the detected and determined three-dimensional structure shapes have quality differences.

Additionally, when the conventional methods are used to construct a three-dimensional map of a city that has a large number of three-dimensional structures in a broad area, considerable human labor and cost are required. For instance, millions of three-dimensional structures are located in 23 wards of Tokyo at present. If one staff member is assumed to be able to deal with 50 structures per a day, it would take more than 200 years to generate all shapes of the three-dimensional structures. Therefore, it is difficult to practically apply the conventional three-dimensional structure shape generation methods to wider areas, for instance, all cities in Japan and all cities around the world.

DISCLOSURE OF INVENTION

It is an object of the present invention to provide an improved automatic three-dimensional structure shape generation apparatus, an automatic three-dimensional structure shape generation method, a program thereof, and a recording medium for storing the program in which the above-mentioned problems are eliminated.

A more specific object of the present invention is to provide an automatic three-dimensional structure shape generation apparatus and an automatic three-dimensional structure shape generation method that can automatically generate shapes of three-dimensional structures of uniform quality at a reasonable cost, a program thereof, and a recording medium for storing the program.

In order to achieve the above-mentioned objects, there is provided according to one aspect of the present invention an automatic three-dimensional structure shape generation apparatus for automatically generating a shape of a three-dimensional structure from a plurality of points having three-dimensional coordinates containing height information, comprising: means for constituting a point group by collecting such points that three-dimensional distances between the points are within a predetermined threshold or two-dimensional distances and height differences between the points are within predetermined thresholds; means for detecting a polygon that includes the points of the point group at a minimum area from at least one of predetermined polygons; and means for generating an outer shape or a rooftop shape of the three-dimensional structure from the polygon having the minimum area.

According to the above-mentioned invention, it is possible to automatically generate shapes of three-dimensional structures of uniform quality with minimal use of human resources.

In the above-mentioned automatic three-dimensional structure shape generation apparatus, the means for detecting the polygon having the minimum area may gradually rotate all points in the point group or at least one of the predetermined polygons by a unit of a predetermined angle so as to find an angle at which the polygon has a minimum area.

According to the above-mentioned invention, it is possible to generate shapes of three-dimensional structures with high accuracy.

In the above-mentioned automatic three-dimensional structure shape generation apparatus, the means for detecting the polygon having the minimum area may detect the polygon that includes the points of the point group at the minimum area based on an angle at which an edge of the polygon that includes the point group coincides with a predetermined direction vector.

According to the above-mentioned invention, the polygon including the points at the minimum area is selected without the gradual rotation of the polygons or the points under the limited direction of the three-dimensional structure. As a result, it is possible to reduce processing time.

From the viewpoint of arrangement of the generated outer shape or the generated rooftop shape of the three-dimensional structure, the above-mentioned automatic three-dimensional structure shape generation apparatus may further comprise means for removing an overflow portion of one of the generated outer shape and the generated rooftop shape of the three-dimensional structure from a corresponding building shape in a two-dimensional electronic map or means for arranging one of the generated outer shape and the generated rooftop shape of the three-dimensional structure such that the generated one is included in the corresponding building shape in the two-dimensional electronic map.

According to the above-mentioned invention, it is possible to generate the outer shape or the rooftop shape of the three-dimensional structure with high accuracy.

Additionally, there is provided according to another aspect of the present invention, that is, an aspect of three-dimensional structure shape generation using coefficients of a predetermined function, an automatic three-dimensional structure shape generation apparatus for automatically generating a shape of a three-dimensional structure from a plurality of points having three-dimensional coordinates containing height information, comprising: means for constituting a point group by collecting such points that three-dimensional distances between the points are within a predetermined threshold or two-dimensional distances and height differences between the points are within predetermined thresholds; means for using height information z (z>0) of the points of the point group and a predetermined function to determine a coefficient of the function such that errors between the points and the function are minimized; and means for generating the shape of the three-dimensional structure based on the coefficient.

According to the above-mentioned invention, it is possible to automatically generate the roof shapes of the three-dimensional structures of uniform quality with minimal use of human resources.

In the above-mentioned automatic three-dimensional structure shape generation apparatus, the means for generating the shape of the three-dimensional structure based on the coefficient may compute at least one coefficient of a power series function whose order is higher than or equal to a first order or a linear combination function of an elementary function in accordance with a least square method, and generate a roof shape of the three-dimensional structure based on a size relation of the at least one coefficient.

According to the above-mentioned invention, it is possible to automatically generate the roof shape of the three-dimensional structure of uniform quality with minimal use of human resources.

In the above-mentioned automatic three-dimensional structure shape generation apparatus, the means for generating the shape of the three-dimensional structure based on the coefficient may extract a plurality of points, which are located at higher positions, from the point group, find a line or a curve such that errors between the plural points located at higher positions and the line or the curve are minimized, and generate a roof shape by determining the one as a roof edge.

According to the above-mentioned invention, it is possible to automatically generate the roof shapes of the three-dimensional structures of uniform quality with minimal use of human resources.

Additionally, it is possible to provide an automatic three-dimensional structure shape generation method with the same operation and effect as the above-mentioned automatic three-dimensional structure shape generation apparatus. Also, it is possible to implement a program for causing a computer to perform a process for the automatic three-dimensional structure shape generation.

BRIEF DESCRIPTION OF DRAWINGS

Other objects, features and advantages of the present invention will become more apparent from the following detailed description when read in conjunction with the accompanying drawings.

FIG. 7A is a diagram illustrating an example of a point group;

FIG. 7B is a diagram illustrating an example of extraction of a subgroup of points at higher positions from the point group in FIG. 7A;

FIG. 7C is a diagram illustrating an example of a determined edge from the extracted subgroup in FIG. 7B;

Figure 1:
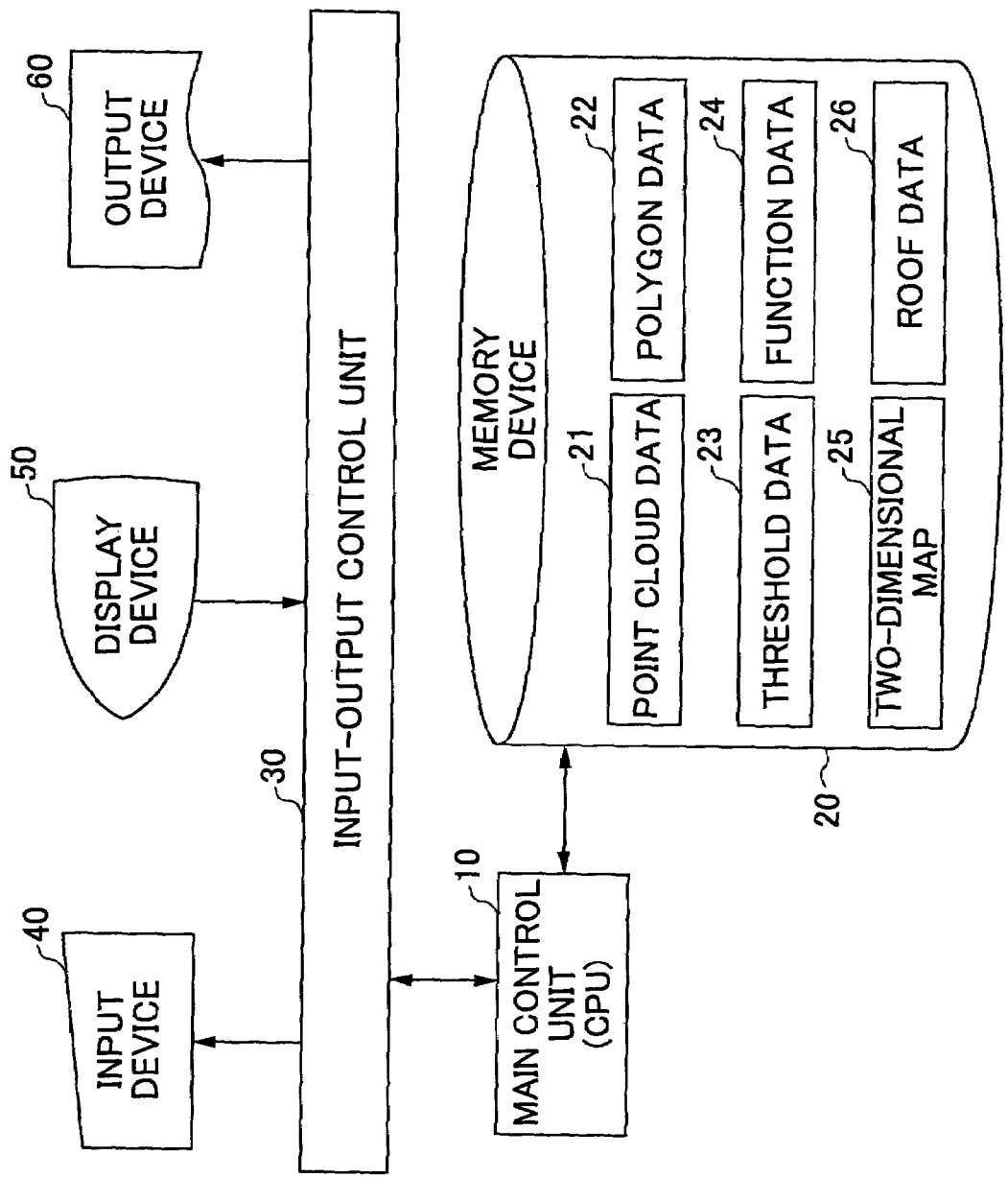
FIG. 1 is a diagram illustrating an example of hardware configuration of an automatic three-dimensional structure shape generation apparatus according to the present invention.

Additionally, primary parts used in FIG. 1 through FIG. 10B are a main control unit 10, a memory device 20, point cloud data 21, polygon data 22, threshold data 23, function data 24, two-dimensional electronic data 25, roof shape data 26, an input-output control unit 30, an input device 40, a display device 50 and an output device 60.

BEST MODE FOR CARRYING OUT THE INVENTION

In the present invention, point cloud data, which are obtained through a laser profiler or other apparatuses, are used to form point groups each of which is constituted of points. The points are grouped in such a way that three-dimensional distances between the points are within a predetermined threshold or both two-dimensional distances and height differences thereof are within predetermined thresholds. For each point group, at least one prepared polygon is used to include all points thereof. At this time, the direction (orientation) of the polygon is determined as such a direction that the polygon occupies the minimum area required to include the points, and then the minimum area is measured. The above measurement is conducted for all prepared polygons. The polygon having the minimum area is selected among the prepared polygons, and an outer shape or a rooftop shape of a three-dimensional structure is generated based on the selected polygon.

Here, the above-mentioned three-dimensional distance between two points means a distance between the two points in a space prescribed by mutually orthogonal three-dimensional coordinate axes: a longitudinal direction, a transverse direction and a vertical direction. On the other hand, the above-mentioned two-dimensional distance between two points means a distance between the two points in a two-dimensional plane prescribed by the longitudinal and the transverse axes.

Also, the rooftop shape according to the present invention is represented as a polygon that is generated based on points, which are located at higher positions, of the point group. The rooftop shape is generated in accordance with the same generation method as the outer shape.

There are some methods for finding the above-mentioned polygon having the minimum area. In one typical method, the minimum-size polygon is found by rotating point cloud data or polygons. In another typical method, the direction of a building shape (direction vector) is determined by using a two-dimensional electronic map, and the minimum-size polygon is found in a state where one edge of the polygon is arranged to the direction. Here, the direction vector is determined by detecting a main direction of the building shape (a south-facing direction, a road-facing direction and so on) based on the position of the building in the two-dimensional electronic map and so on.

Additionally, if the generated outer shape or roof shape of the three-dimensional structure is compared with the building shape in the two-dimensional electronic map, it is possible to generate the three-dimensional structure with high accuracy by removing an overflow portion of the outer shape or the rooftop shape from the corresponding building shape in the two-dimensional electronic map or shaping the outer shape or the rooftop shape such that the outer shape or the rooftop shape is included in the building shape.

On the other hand, a roof shape is generated as follows. First, a height coordinate of each point of the point group is represented as z (z>0), and at least one coefficient of a formula z=f(x, y), which is formulated as a power series function whose order is more than or equal to the first order or a linear combination function of elementary functions, is found in accordance with the least squares method. Then, the roof shape of the three-dimensional structure is generated based on sizes of found coefficients.

Here, when the roof shape is generated, a plurality of points located at higher positions are sampled from the point group. Then, a line (or a curve) that is located at minimum distances from the sampled points is found in accordance with the least squares method. If the line (or the curve) is considered as an edge of the roof, it is possible to generate the roof shape including the edge.

In the following, embodiments of the present invention will be described with reference to the accompanying drawings.

FIG. 1 shows an example of hardware configuration of an automatic three-dimensional structure shape generation apparatus according to the present invention.

In FIG. 1, a memory device 20 is connected to a main control unit 10 (a control unit, which is referred to as a CPU (Central Processing Unit) hereinafter) programmed to control the overall automatic three-dimensional structure shape generation apparatus. The CPU 10 is connected to an input device 40 comprised of a keyboard and a pointing device such as a mouse via an input control unit 30, a display device 50 such as a monitor for displaying execution instruction screens, input results and so on, and an output device 60 for outputting generated three-dimensional structures. The CPU 10 contains an inner memory for storing operating programs such as OS (Operating System), programs for prescribing procedures for generating three-dimensional structures, and necessary data. By executing these programs, it is possible to implement the above-mentioned process for detecting a polygon that includes points of a point group at a minimum area, the above-mentioned process for generating an outer shape or a rooftop shape of a three-dimensional structure from the detected polygon of the minimum area, and other processes. The memory device 20 serves as a storage part for such as a hard disk, a flexible disk, an optical disk and so on. Point cloud data 21, polygon data 22, threshold data 23, function data 24, two-dimensional map data 25 and roof data 26 are stored in the memory device 20.

A description will now be given, with reference to the hardware configuration in FIG. 1, of the process for automatically generating shapes of three-dimensional structures.

Figure 2:
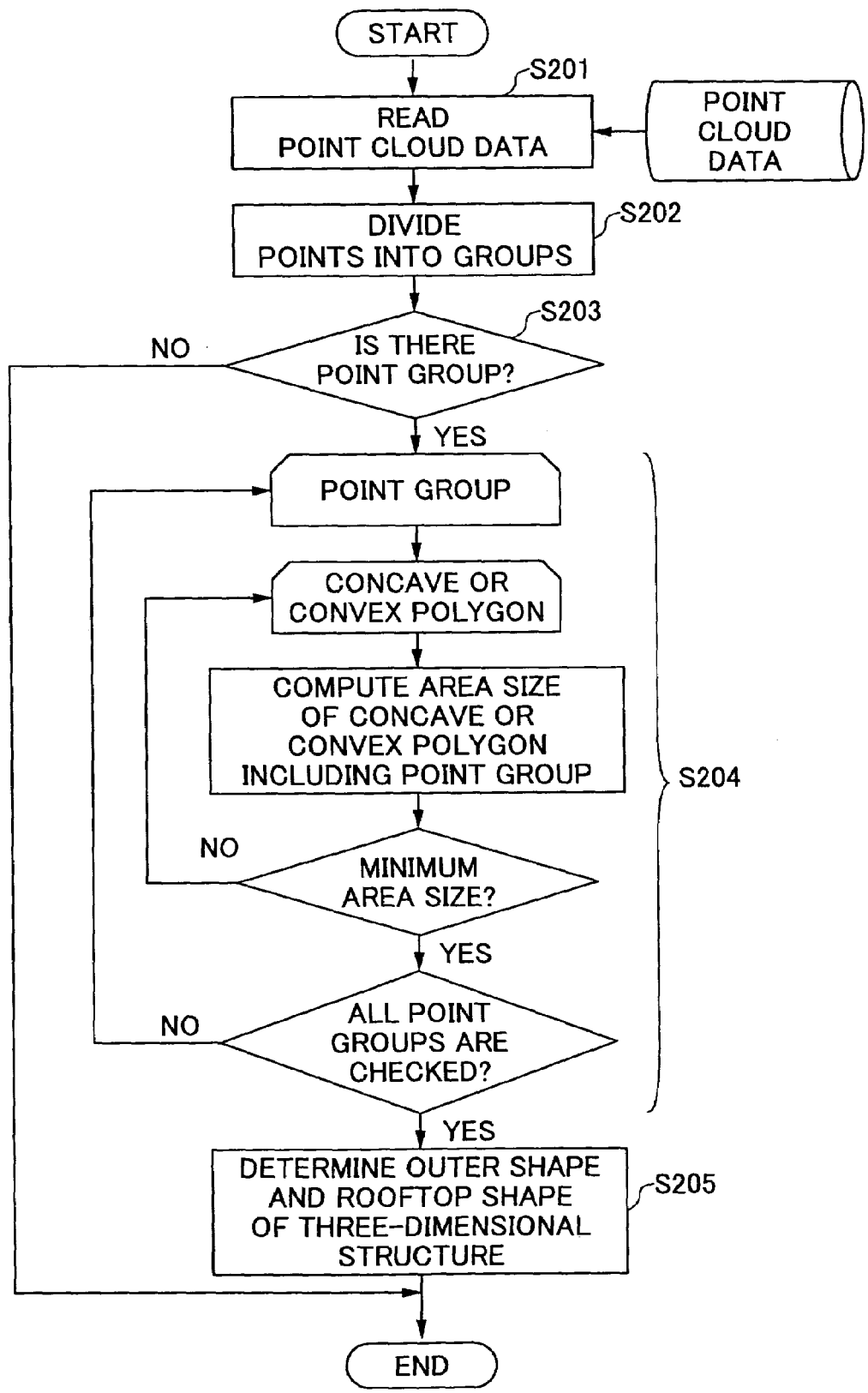
FIG. 2 is a flowchart of an algorithm for generating an outer shape and a rooftop shape of a three-dimensional structure based on point cloud data.

FIG. 2 is a flowchart of an algorithm for automatically generating outer shapes and rooftop shapes of three-dimensional structures from point cloud data.

In FIG. 2, when the CPU 10 receives an execution instruction from the input device 40, the CPU 10 reads the point cloud data 21 obtained through a laser profiler and others from the memory device 20 (S201). Normally, the point cloud data are represented as three-dimensional coordinates of several hundred thousand points per one square kilometer. Then, the CPU 10 computes three-dimensional distances of at least three points or both two-dimensional distances and height differences thereof for all input points. The values are compared with a threshold $\theta_1$ in the threshold data 23 in the memory device 20, and the input points are divided into groups by collecting points within the threshold $\theta_1$ (S202). After S202, it is determined whether or not there exists a point group (S203). If there is no point group (S203: NO), the CPU 10 terminates the current process and displays the result on the display apparatus 50. If there is at least one point group (S203: YES), the CPU 10 detects a polygon that includes all points of the point group at a minimum area (S204) among prepared polygons in advance. Fundamental shapes of the polygons in use here, which are concave or convex polygons, are prescribed in advance, and the polygons are stored as the polygon data 22 in the memory device 20. For instance, the convex polygons have a rectangular shape, a diamond shape, a regular octagonal shape, and so on, and the concave polygons are L-shaped, U-shaped, T-shaped, cross-shaped and so on. The CPU 10 assigns these concave or convex polygons for each point group of at least one point (S204), and the outer shape and the rooftop shape of the three-dimensional structure are determined (S205).

Here, when the CPU 10 detects a concave or convex polygon that includes points at a minimum area, the CPU 10 needs to determine arrangement (orientation) of each of the prepared convex or concave polygons through such an optimal angle thereof at which the polygon has the minimum area.

A description will now be given, with reference to a drawing, of a method for finding the optimal arrangement (angle).

Figure 3:
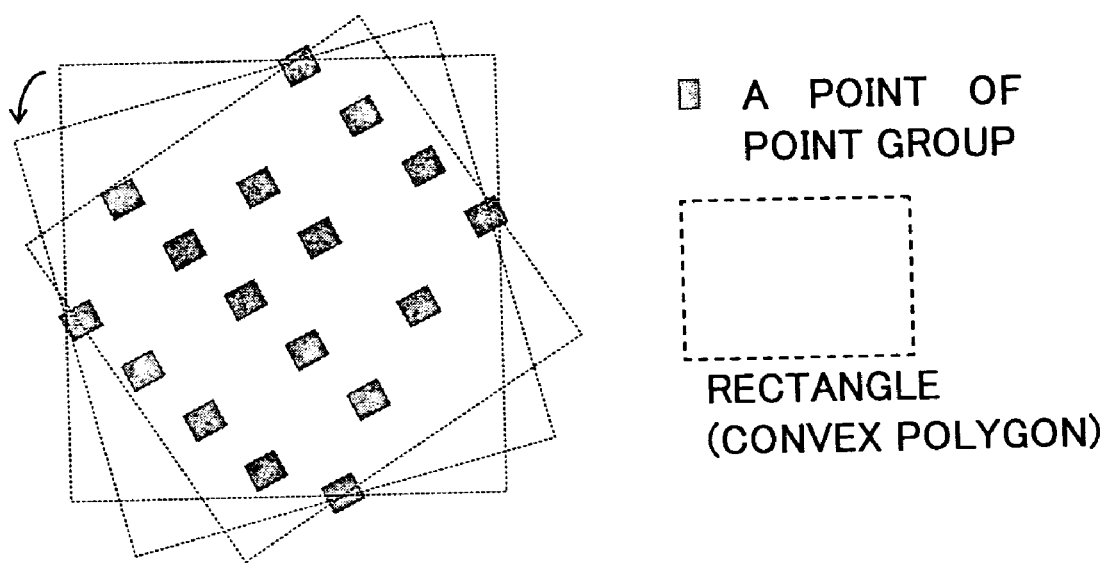
FIG. 3 is a diagram illustrating a method for determining arrangement of a polygon that includes points at a minimum area.

FIG. 3 shows an example of the method for determining arrangement of a polygon that includes points at a minimum area.

In FIG. 3, a rectangle (convex polygon) is used as one of the polygons. The CPU 10 rotates the rectangle in contact with points counterclockwise bit by bit. The CPU 10 computes the area of the rectangle that includes all the points and then determines a position of the rectangle where the rectangle has the minimum area. Similarly, the CPU 10 computes a minimum area for each concave or convex polygon such as a pentagon and a U-shaped polygon in the polygon data 22. Finally, the CPU 10 selects the smallest polygon among the computed optimally arranged polygons and determines an outer shape or a rooftop shape of the three-dimensional structure based on the shape of the smallest polygon.

Although the rectangle is rotated counterclockwise in FIG. 3, the present invention is not limited to the counterclockwise rotation. For instance, the rectangle may be rotated clockwise. Alternatively, the point group may be rotated in a fixed state of the polygon.

A description will now be given, with reference to a drawing, of the second method for generating outer shapes and rooftop shapes.

Figure 4:
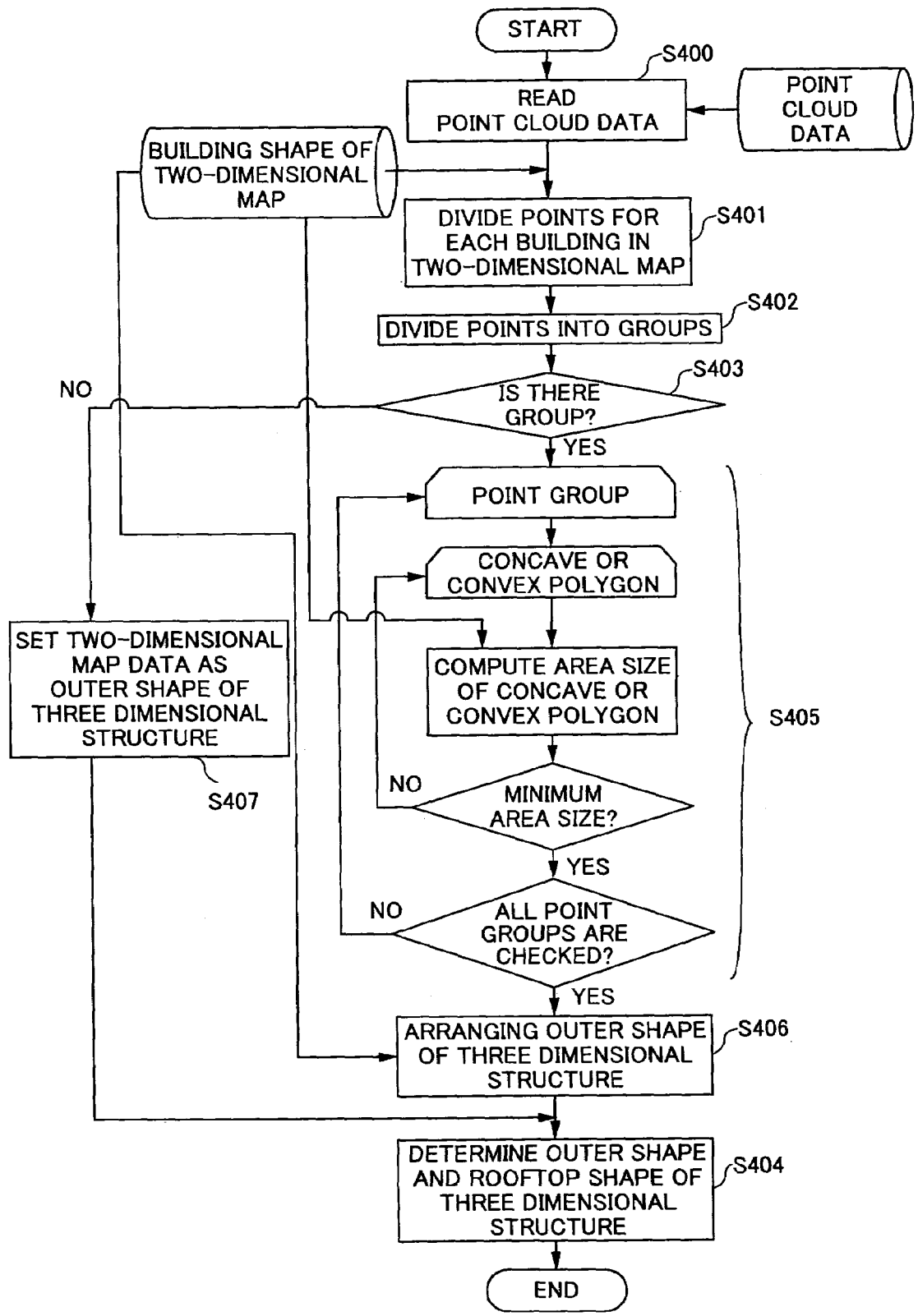
FIG. 4 is a flowchart of a procedure for generating the outer shape and the rooftop shape of the three-dimensional structure based on the point cloud data and a building shape in a two-dimensional electronic map.

FIG. 4 is a flowchart of a procedure for generating an outer shape and a rooftop shape of a three-dimensional structure from point cloud data together with the corresponding building shape in a two-dimensional electronic map.

In FIG. 4, when the CPU 10 receives an execution instruction from the input device 40 in the same way as S201, the CPU 10 reads the point cloud data 21 in the memory device 20 (S400). Then, the CPU 10 reads the two-dimensional electronic map data 25 from the memory device 20 and divides the point cloud data into groups based on the corresponding building shapes in the two-dimensional electronic map data 25 (S401). The CPU 10 further groups points in the point groups divided at step S401 based on a threshold $\theta_2$ in the threshold data 23 (S402). Then, the CPU 10 determines whether or not there is a grouped point group (S403). If there is no such a point group (S403: NO), the CPU 10 sets the two-dimensional electronic map data 25 as an outer shape of the three-dimensional structure (S407) and determines the outer shape and the rooftop shape of the three-dimensional structure (S404). On the other hand, if there is at least one point group (S403: YES), the CPU 10 detects a polygon that includes the points at a minimum area for each point group (S405).

Here, when areas of the concave or convex polygons including the point group are computed and the minimum-size polygon is detected, it is possible to use the two-dimensional electronic map data 25 to obtain the direction of a building shape located at the same position as the point group as a direction vector and narrow positions of the polygons (angles and directions) by matching the direction vector with edges of the polygons. As a result, if the two-dimensional electronic map data 25 are used, it is unnecessary to rotate the polygons bit by bit as described with reference to FIG. 3 so as to determine such positions thereof at which the areas are minimized. Thus, it is possible to reduce processing time.

Then, the CPU 10 compares the determined polygon that includes the points at the minimum area with the corresponding building shape in the two-dimensional electronic map data 25 and arranges the outer shape of the polygon by removing an overflow of the determined polygon from the building shape in the two-dimensional electronic map data 25 such that the polygon is included in the building shape in the two-dimensional electronic map (S406). After that, the CPU 10 determines the outer shape and the rooftop shape of the three-dimensional structure (S404). As a result, it is possible to generate the outer shape or the rooftop shape of the three-dimensional structure with high accuracy.

According to execution of the above-mentioned procedures in FIG. 2 and FIG. 4, it is possible to determine the outer shape and the rooftop shape, two of the three items constituting the three-dimensional structure: the outer shape, the rooftop shape and the roof shape.

A description will now be given, with reference to a drawing, of an algorithm for automatically generating a roof shape.

Figure 5:
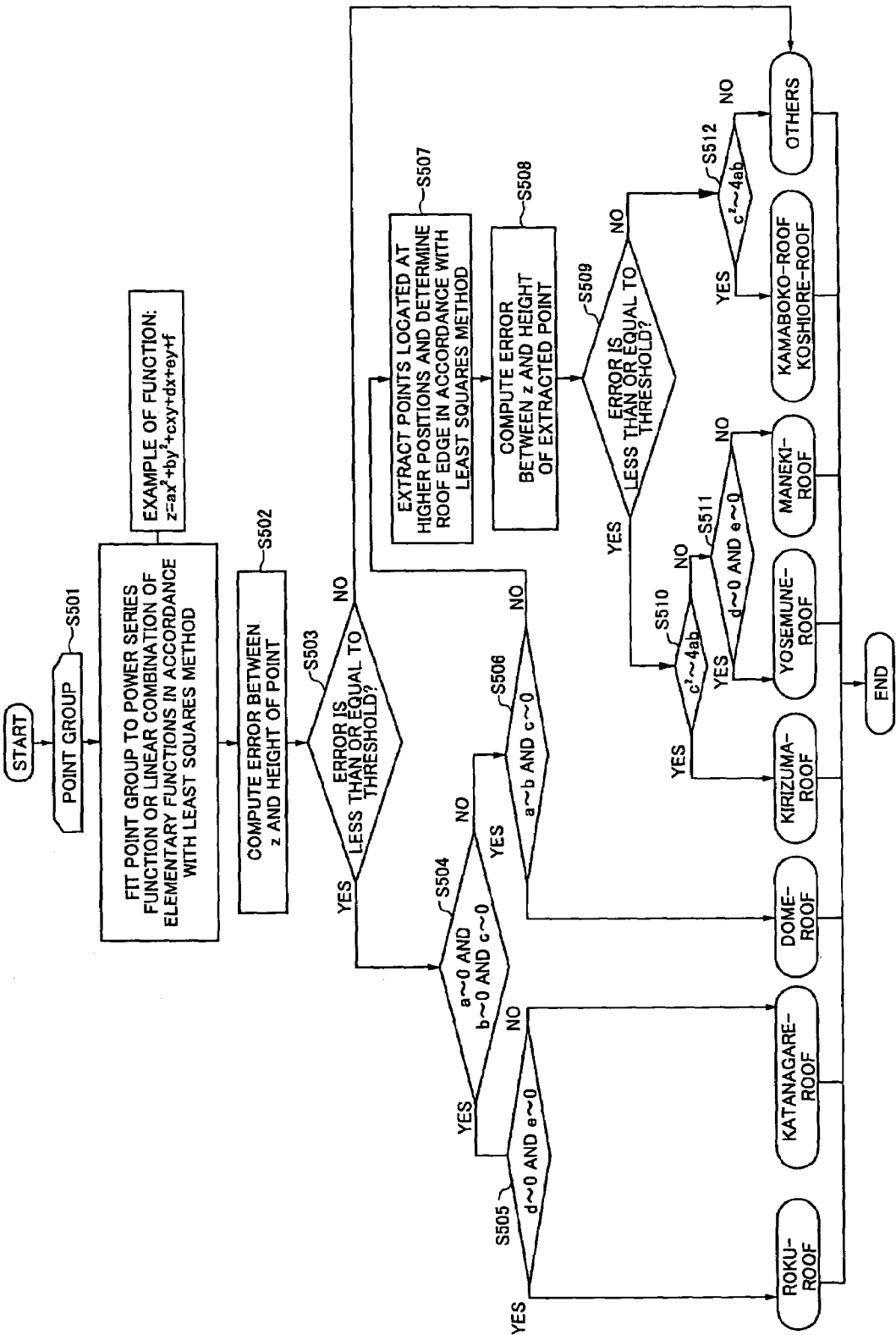
FIG. 5 is a flowchart of a procedure for generating a roof shape of a three-dimensional structure based on a point group.

FIG. 5 is a flowchart of a procedure for generating a roof shape of a three-dimensional structure from a point group.

In FIG. 5, the CPU 10 receives point groups obtained at step S202 or step S402 (S501). Then, the CPU 10 uses functions (power series functions whose order is more than or equal to the first order or linear combination functions of elementary functions such as trigonometric functions or exponential functions) in the function data 24 in the memory device 20 to compute such a function that differences between individual heights z (z>0) and function values are minimized in accordance with the least squares method. Here, the power series functions are series formulated by multiplying a number or a character several times, and the least squares method is a method for determining such a line (curve) that a sum of squares of differences between the line (curve) and individual points, that is, an area of differences between the line (curve) and individual points, is minimized.

In FIG. 5, a second-order power series function ($z=ax^2+by^2+cxy+dx+ey+f$) is examined as a function to be determined in accordance with the least squares method. In this example, the six coefficients: a, b, c, d, e and f are determined in accordance with the least squares method (x and y are variables).

Figure 6:
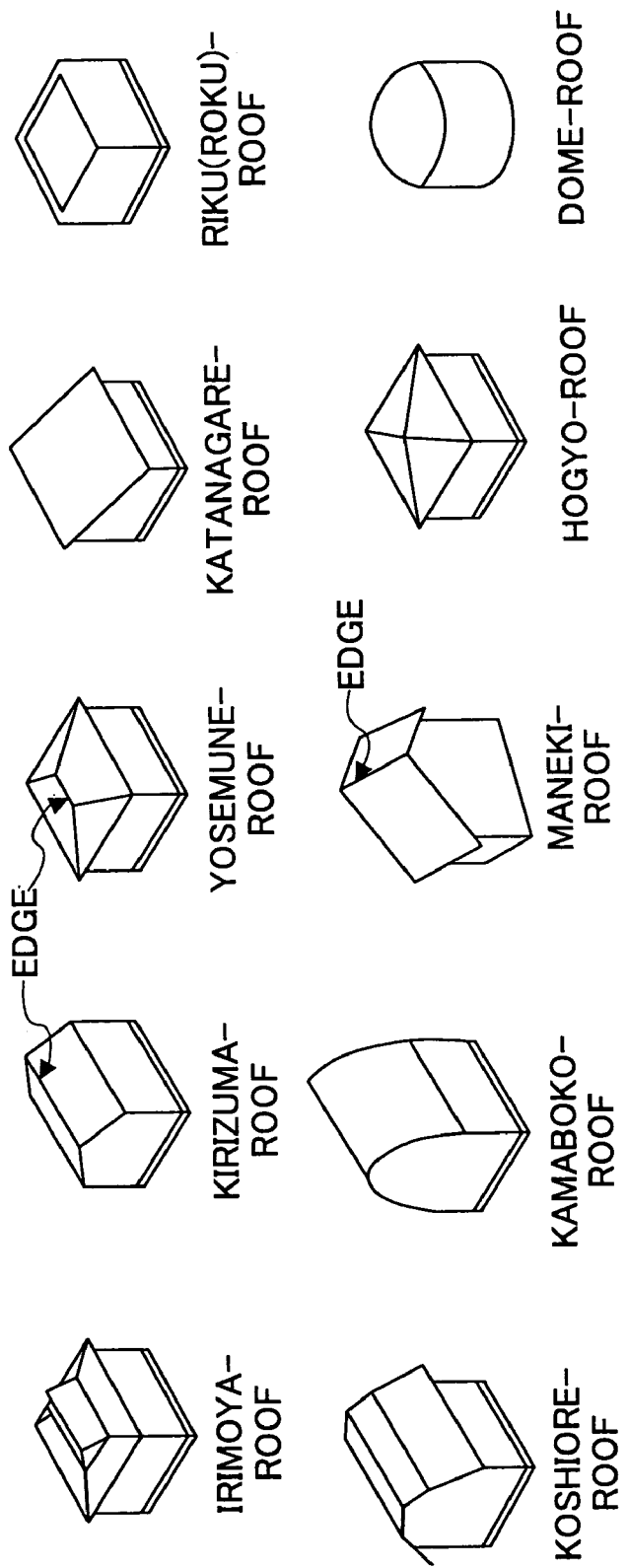
FIG. 6 is a diagram illustrating roof shapes and names thereof.

The CPU 10 computes an error between the height z of the power series function and the height of a point (S502), and it is determined whether or not the error is less than or equal to a threshold $\theta_3$ in the threshold data 23 (S503). If the error is less than or equal to the threshold $\theta_3$ (S503: YES), the CPU 10 proceeds to a determination step of a roof shape. In the roof shape determination step, the roof shape is determined among a plurality of roof shapes based on the determined coefficients (a, b, c, d, e and f). Here, the plural roof shapes are stored in the roof shape data 26 in the memory device 20. FIG. 6 is a diagram illustrating an example of roof shapes and names thereof.

In FIG. 5, for instance, if the coefficients a, b and c are approximately equal to 0 (S504: YES) and further the coefficients d and e are approximately equal to 0 (S505: YES), the CPU 10 determines the roof shape as "roku-roof". On the other hand, if the coefficient d or e is not approximately equal to 0 (S505: NO), the CPU 10 determines the roof shape as "katanagare-roof". In FIG. 5, the notation "~"

represents approximation. For instance, the notation "a~0" represents that the coefficient a is approximately equal to 0, and the notation "a~b" represents that the coefficient a is approximately equal to b.

At step S504, if at least one of the coefficients a, b and c is not approximately equal to 0 (S504: NO), the coefficient a is approximately equal to the coefficient b, and the coefficient c is approximately equal to 0 (S506: YES), the CPU 10 determines the roof shape as "dome-roof".

Here, if the coefficient a is not approximately equal to the coefficient b or the coefficient c is not approximately equal to 0 (S506: NO), the CPU 10 determines the roof shape based on an edge thereof. Namely, when the roof has the edge as in the "kirizuma-roof", "yosemune-roof" and "maneki-roof" (ref. FIG. 6), the CPU 10 extracts points located at higher positions (points of large z values) from the point group so as to determine the roof shape. Based on the extracted points, the CPU 10 determines the edge from functions (lines or curves) in the function data 24 in accordance with the least squares method (S507). Then, the CPU 10 computes errors between the extracted points and the function values and then finds coefficients of the function (S508), and it is determined whether or not the errors are less than or equal to a threshold $\theta_4$ (S509). Additionally, the CPU 10 determines the roof shape in comparison with the computed coefficients.

A description will now be given, with reference to drawings, of a process flow for determining an edge from a point group.

From points in the point group as shown in FIG. 7A, the CPU 10 extracts points located at higher positions as shown in FIG. 7B. The CPU 10 determines a line (curve) in accordance with the least squares method such that errors between the extracted points at high positions and values of a predetermined function are minimized, and the line (curve) is determined as the edge (FIG. 7C).

At step S509, if the error is less than or equal to the threshold $\theta_4$ (S509: YES), it is determined whether or not the value "$c^2$" is approximately equal to the value "4ab" (S510). If the value "$c^2$" is approximately equal to the value "4ab" (S510: YES), the roof shape is determined as a "kirizuma-roof". In contrast, if the value "$c^2$" is not approximately equal to the value "4ab" at step S510 (S510: NO) and further the coefficients d and e are approximately equal to 0 (S511: YES), the roof shape is determined as a "yosemune-roof". Here, if the coefficient d or e is not approximately equal to 0 (S511: NO), the roof shape is determined as a "maneki-roof".

At step S509, if the error is not less than or equal to the threshold $\theta_4$ (S509: NO), it is determined whether or not the value "$c^2$" is approximately equal to the value "4ab" (S512). If the value "$c^2$" is approximately equal to the value "4ab" (S512: YES), the roof shape is determined as a "kamaboko-roof" or a "koshiore-roof". In contrast, if the value "$c^2$" is not approximately equal to the value "4ab" (S512: NO) or if the error is not less than or equal to the threshold $\theta_3$ (S503: NO), the roof shape is determined as "others" and is arbitrarily set. According to the above-mentioned procedure, it is possible to automatically generate the roof shapes of three-dimensional structures of uniform quality. Here, the automatic roof shape generation algorithm shown in FIG. 5 is not limited to the above-mentioned procedure, and variations thereof can be made corresponding to comparison contents of functions in use and coefficients thereof.

The CPU 10 supplies the obtained three-dimensional structure data of the outer shape, the rooftop shape and the roof shape generated to the output device 60, and then the process result is displayed on the display device 50.

According to the present invention, by using only three-dimensional point cloud data having height information thereof or using building shapes in a two-dimensional electronic map together with the point cloud data, it is possible to automatically generate shapes of three-dimensional structures of uniform quality at a reasonable cost.

It is noted that programs according to the present invention are executable in arbitrary terminals by storing the programs in a portable recording medium such as a CD-ROM (Compact Disk Read Only Memory) and a floppy disk.

Figure 8:
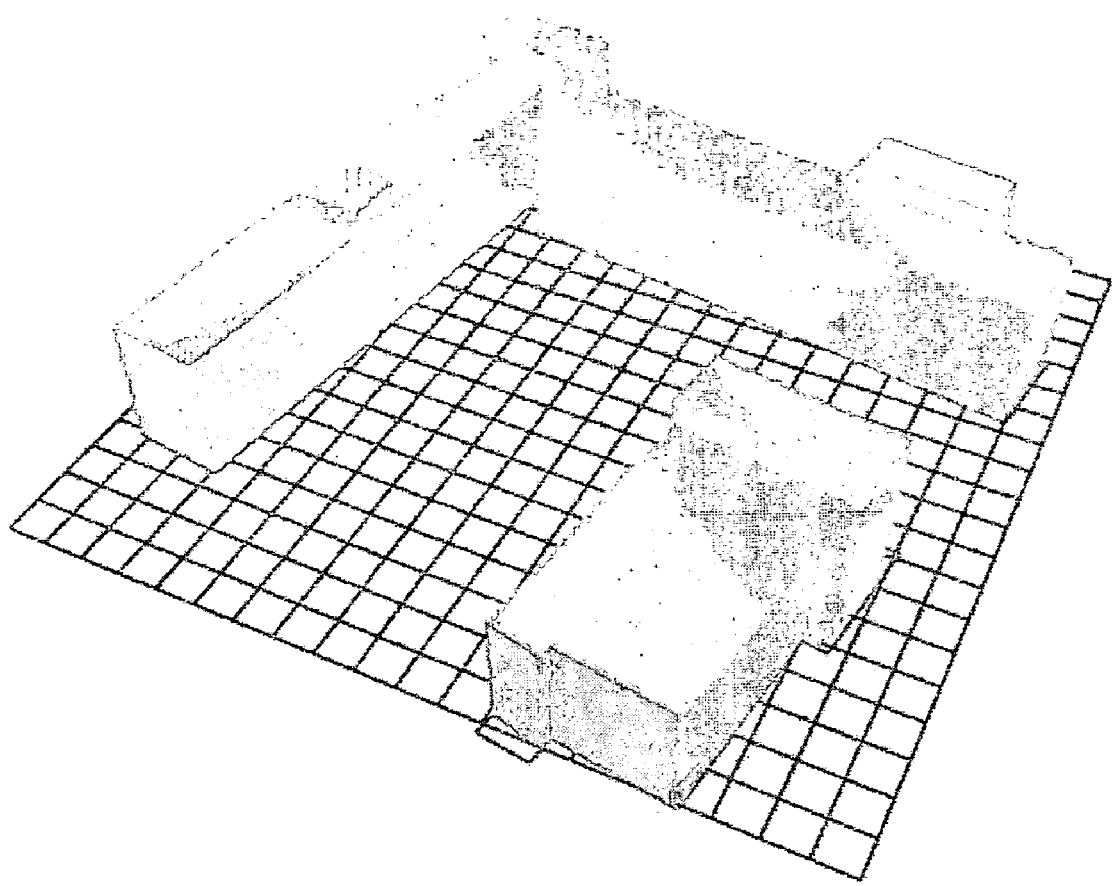
FIG. 8 is a diagram illustrating an example of three-dimensional structures generated in accordance with the present invention.

FIG. 8 shows an example of a three-dimensional structure generated according to the present invention.

The three-dimensional structure in FIG. 8 is generated in such a way that an outer shape thereof is determined based on the procedure described with reference to FIG. 2 and a rooftop shape thereof is determined by setting the average of points in a point group as a height thereof.

Figure 9:
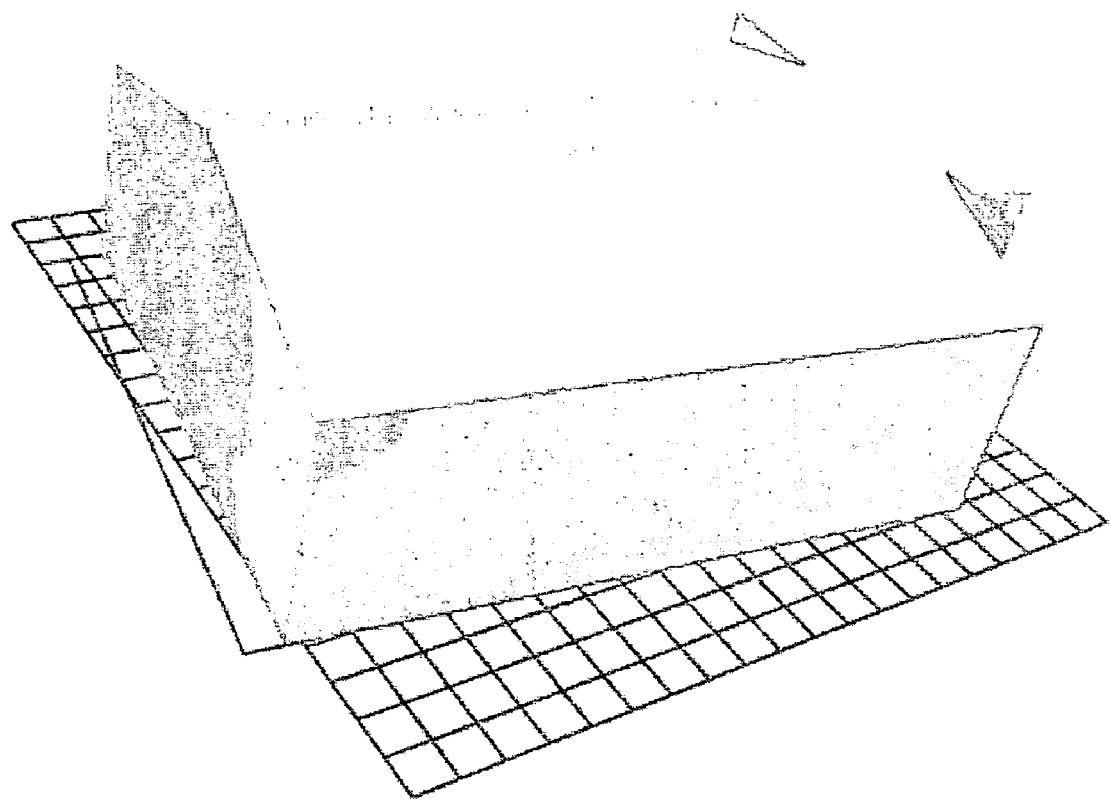
FIG. 9 is a diagram illustrating a second example of a three-dimensional structure generated in accordance with the present invention.

Additionally, FIG. 9 shows a second example of the three-dimensional structure generated according to the present invention.

The three-dimensional structure in FIG. 9 has an outer shape, a rooftop shape and a roof shape that are determined based on the procedures with reference to FIG. 4 and FIG. 5. In FIG. 9, the "kirizuma-roof" is automatically generated as the roof shape thereof.

Figure 10A:
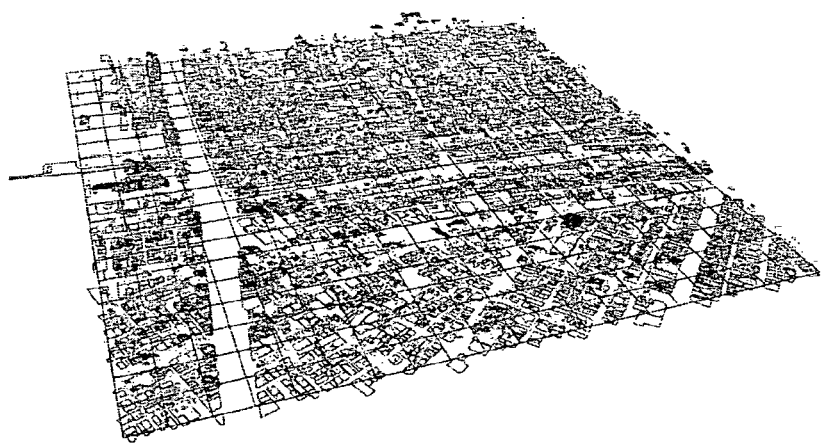
FIG. 10A is a diagram illustrating point cloud data in a block (1 km$^2$) in Tokyo obtained by using a laser profiler.
Figure 10B:
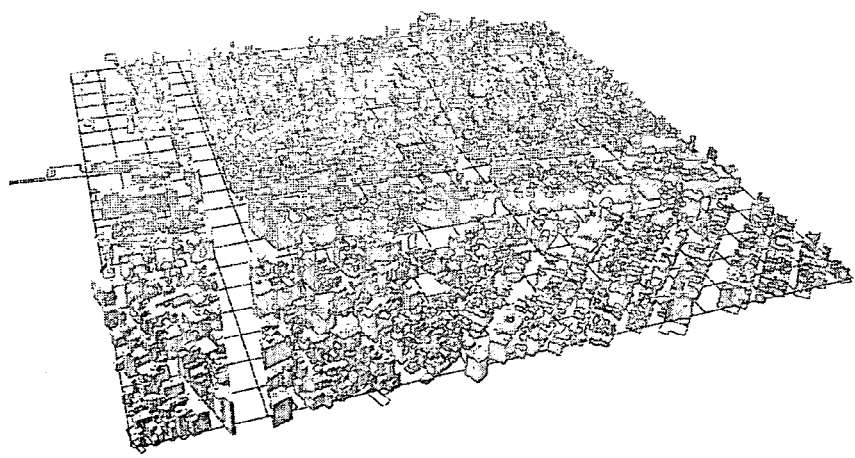
FIG. 10B is a diagram illustrating an example of three-dimensional structures automatically generated based on the point cloud data in FIG. 10A.

FIG. 10A shows point cloud data in a block (1 km$^2$) in Tokyo obtained with a laser profiler, and FIG. 10B shows an example of three-dimensional structures generated from the point cloud data in FIG. 10A in accordance with the present invention. Although there are about 4000 buildings in this block, it is possible to generate all the three-dimensional structures in about 30 minutes in accordance with the automatic three-dimensional structure shape generation method according to the present invention (by using one computer with an 800 MHz Pentium(R) III CPU). Additionally, it is possible to suppress quality differences with respect to the generated three-dimensional structure shapes.

Consequently, for instance, if the automatic three-dimensional structure generation method is applied to all of the 23 wards in Tokyo, it takes only about 300 hours (about 12 days) to process data thereof. Furthermore, since the automatic three-dimensional structure generation method can be executed for each block (point cloud data region) separately, it is possible to reduce computation time thereof corresponding to the number of computers in use. Additionally, if future performance improvement of computers is taken into account, it is possible to expect further reduction of the computation time.

As mentioned above, according to the present invention, it is possible to automatically generate shapes of three-dimensional structures of uniform quality at a reasonable cost.

The present invention is not limited to the specifically disclosed embodiments, and variations and modifications may be made without departing from the scope of the present invention.

The invention claimed is:

1. An apparatus for automatically generating an outer or rooftop shape of a three-dimensional structure from a plurality of points having three-dimensional coordinates containing height information, comprising:

means for constituting a point group by collecting such points that three-dimensional distances between said points are within a predetermined threshold or two-dimensional distances and height differences between said points are within predetermined thresholds;

means for detecting a polygon that includes the points of the point group at a minimum area from at least one of a plurality of predetermined polygons; and means for generating one of an outer shape end a rooftop shape of the three-dimensional structure based on said detected polygon having the minimum area, wherein said means for detecting the polygon having the minimum area gradually rotates one of all points of said point group and at least one of the predetermined polygons by a unit of a predetermined angle so as to find an angle at which said polygon has a minimum area.

2. The apparatus as claimed in claim 1, wherein said means for detecting the polygon having the minimum area detects the polygon that includes the points of the point group at the minimum area based on an angle at which an edge of said polygon that includes the point group coincides with a predetermined direction vector.

3. The apparatus as claimed in claim 1, further comprising at least one of means for removing an overflow portion of one of the generated outer shape and the generated rooftop shape of the three-dimensional structure from a corresponding building shape in a two-dimensional electronic map and means for arranging one of the generated outer shape and the generated rooftop shape of the three-dimensional structure such that said generated one is included in said corresponding building shape in the two-dimensional electronic map.

4. An apparatus for automatically generating a shape of a three-dimensional structure from a plurality of points having three-dimensional coordinates containing height information, comprising;

means for constituting a point group by collecting such points that three-dimensional distances between said points are within a predetermined threshold or two-dimensional distances and height differences between said points are within predetermined thresholds;

means for using height information z (z>0) of the points of the point group and a predetermined function to determine a coefficient of said function such that errors between said points and said function are minimized; and means for generating the shape of the three-dimensional structure based on said coefficient.

5. The apparatus as claimed in claim 4, wherein said means for generating the shape of the three-dimensional structure based on the coefficient computes at least one coefficient of one of a power series function whose order is higher than or equal to a first order and a linear combination function of an elementary function in accordance with a least square method, and generate a roof shape of the three-dimensional structure based on a size relation of said at least one coefficient.

6. The apparatus as claimed in claim 4, wherein said means for generating the shape of the three-dimensional structure based on the coefficient extracts a plurality of points, which are located at higher positions, from the point group, finds one of a line and a curve such that errors between said plural points located at higher positions and said one are minimized, and generates a roof shape by determining said one as a roof edge.

7. A method for generating an outer or rooftop shape of a three-dimensional structure from a plurality of points having three-dimensional coordinates containing height information, the automatic three-dimensional structure shape generation method comprising the steps of:

constituting a point group by collecting such points that three-dimensional distances between said points are within a predetermined threshold or two-dimensional distances and height differences between said points are within predetermined thresholds;

detecting a polygon that includes the points of the point group at a minimum area from at least one of a plurality of predetermined polygons; and generating one of an outer shape and a rooftop shape of the three-dimensional structure based on said polygon having the minimum area, wherein said step of detecting a polygon having the minimum area, gradually rotates one of all points of said point group and at least one of the predetermined polygons by a unit of a predetermined angle so as to find an angle at which said polygon has a minimum area.

8. The method as claimed in claim 7, wherein said step of detecting the polygon having the minimum area detects the polygon that includes the points of the point group at the minimum area based on an angle at which an edge of said polygon that includes the point group coincides with a predetermined direction vector.

9. The method as claimed in claim 7 further comprising one of:

a step of removing an overflow portion of one of the generated outer shape and the generated rooftop shape of the three-dimensional structure based on a corresponding building shape in a two-dimensional electronic map; and a step of arranging one of the generated outer shape and the generated rooftop shape of the three-dimensional structure such that said generated one is included in said corresponding building shape in the two-dimensional electronic map.

10. A method for automatically generating an outer or rooftop shape of a three-dimensional structure from a plurality of points having three-dimensional coordinates containing height information, the automatic three-dimensional structure shape generation method comprising the steps of:

constituting a point group by collecting such points that three-dimensional distances between said points are within a predetermined threshold or two-dimensional distances and height differences between said points are within predetermined thresholds;

using height information z (z>0) of the points of the point group and a predetermined function to determine a coefficient of said function such that errors between said points and said function are minimized; and generating the shape of the three-dimensional structure based on said coefficient.

11. The method as claimed in claim 10, wherein said step of generating the shape of the three-dimensional structure based on the coefficient computes at least one coefficient of one of a power series function whose order is higher than or equal to a first order and a linear combination function of an elementary function in accordance with a least square method, and generates a roof shape of the three-dimensional structure based on a size relation of said at least one coefficient.

12. The method as claimed in claim 10, wherein said step of generating the shape of the three-dimensional structure based on the coefficient extracts a plurality of points, which are located at higher positions, from the point group, finds one of a line and a curve such that errors between said plural points located at higher positions and said one are minimized, and generates a roof shape by determining said one as a roof edge.

13. A program for causing a computer to generate an outer or rooftop shape of a three-dimensional structure from a plurality of points having three-dimensional coordinates containing height information, said program performing operations that comprise the steps of:
constituting a point group by collecting such points that three-dimensional distances between said points are within a predetermined threshold or two-dimensional distances and height differences between said points are within predetermined thresholds;
detecting a polygon that includes the points of the point group at a minimum area from at least one of a plurality of predetermined polygons; and
generating one of an outer shape and a rooftop shape of the three-dimensional structure based on said detected polygon having the minimum area,
wherein said step of detecting the polygon having the minimum area gradually rotates one of all points of said point group and at least one of the predetermined polygons by a unit of a predetermined angle so as to find an angle at which said polygon has a minimum area.

14. The program as claimed in claim 13 wherein said step of detecting the polygon having the minimum area detects the polygon that includes the points in the point group at the minimum area based on an angle at which an edge of said polygon that includes the point group coincides with a predetermined direction vector.

15. The program as claimed in claim 13 further comprising one of a step of removing an overflow portion of one of the generated outer shape and the generated rooftop shape of the three-dimensional structure from a corresponding building shape in a two-dimensional electronic map and a step of arranging one of the generated outer shape and the generated rooftop shape of the three-dimensional structure such that said generated one is included in said corresponding building shape in the two-dimensional electronic map.

16. A program for causing a computer to automatically generate an outer or rooftop shape of a three-dimensional structure from a plurality of points having three-dimensional coordinates containing height information, comprising the steps of:
constituting a point group by collecting such points that three-dimensional distances between said points are within a predetermined threshold or two-dimensional distances and height differences between said points are within predetermined thresholds;
using height information z (where z>0) of the points of the point group and a predetermined function to determine a coefficient of said function such that errors between said points and said function are minimized; and
generating the shape of the three-dimensional structure based on said coefficient.

17. The program as claimed in claim 16, wherein said step of generating the shape of the three-dimensional structure based on the coefficient computes at least one coefficient of one of a power series function whose order is higher than or equal to a first order and a linear combination function of an elementary function in accordance with a least square method, and generates a roof shape of the three-dimensional structure based on a size relation of said at least one coefficient.

18. The program as claimed in claim 16, wherein said step of generating the shape of the three-dimensional structure based on the coefficient extracts a plurality of points, which are located at higher positions, from the point group, finds one of a line and a curve such that errors between said plural points located at higher positions and said one are minimized, and generates a roof shape by determining said one as a roof edge.

19. A computer-readable media having stored thereon instructions, which when executed by one or more processors, cause one or more processors to perform acts comprising:
constituting a point group by collecting such points that three-dimensional distances between said points are within a predetermined threshold or two-dimensional distances and height differences between said paints are within predetermined thresholds;
detecting a polygon that includes the points of the point group at a minimum area from at least one of a plurality of predetermined polygons; and
generating one of an outer shape and a rooftop shape of the three-dimensional structure based on said detected polygon having the minimum area,
wherein said step of detecting the polygon having the minimum area gradually rotates one of all points of said point group and at least one of the predetermined polygons by a unit of a predetermined angle so as to find an angle at which said polygon has a minimum area.

* * * * *

UNITED STATES PATENT AND TRADEMARK OFFICE
CERTIFICATE OF CORRECTION

PATENT NO. : 7,098,909 B2  
APPLICATION NO. : 10/433315  
DATED : August 29, 2006  
INVENTOR(S) : Tomoaki Hayano et al.

It is certified that error appears in the above-identified patent and that said Letters Patent is hereby corrected as shown below:

Title page, Section (22)    delete "Sep. 28, 2002" and Insert --June 28, 2002--.

Signed and Sealed this

Twenty-fourth Day of June, 2008

JON W. DUDAS  
*Director of the United States Patent and Trademark Office*